United States Patent [19]

Johnson

[11] Patent Number: 4,771,288

[45] Date of Patent: Sep. 13, 1988

[54] CENTROID DETECTION APPARATUS AND METHOD THEREFOR

[75] Inventor: Robert H. Johnson, Scottsdale, Ariz.

[73] Assignee: Motorola, Inc., Schaumburg, Ill.

[21] Appl. No.: 735,018

[22] Filed: May 17, 1985

[51] Int. Cl.[4] .................................................. G01S 13/00
[52] U.S. Cl. .................................... 342/188; 342/147; 342/155
[58] Field of Search ............ 343/17.1 R, 5 PD, 16 R, 343/16 LS; 342/28, 147, 149, 155, 188

[56] References Cited

U.S. PATENT DOCUMENTS

| | | |
|---|---|---|
| 3,025,517 | 3/1962 | Watson et al. .................. 342/433 X |
| 3,210,762 | 10/1965 | Brabant . |
| 3,348,227 | 10/1967 | Rolfs ................................ 343/768 |
| 3,701,158 | 10/1972 | Johnson ........................... 343/725 |
| 4,263,598 | 4/1981 | Bellee et al. ................. 343/700 MS |

Primary Examiner—Thomas H. Tarcza
Assistant Examiner—John B. Sotomayor
Attorney, Agent, or Firm—Maurice J. Jones

[57] ABSTRACT

A radar device radiates and receives radio frequency energy pulses using an antenna having two independently driven major lobes. The two major lobes aim in two separate directions, and a third direction halfway between the two directions exhibited by the two major lobes represents an aim line of the apparatus. The antenna selectively radiates both circularly and linearly polarized pulses. Reflections received from circularly and linearly polarized pulses are compared to prevent a false indication of an object's centroid.

17 Claims, 2 Drawing Sheets

CENTROID DETECTION APPARATUS AND METHOD THEREFOR

BACKGROUND OF THE INVENTION

This invention relates generally to the detection of objects using radar techniques. More specifically, the present invention relates to the detection of the centroid of an object in addition to merely detecting the object's presence.

The word centroid as used herein is intended to encompass the central area of an object and not merely the precise geometric center. Many varied techniques may be employed to detect the mere presence of an object. However, the detection of the centroid of an object presents a unique set of problems. A centroid detector must distinquish an object from a background environment, yet remain insensitive to the object's periphery. When an object may exhibit many different shapes, sizes, velocities, and angles of approach and departure, problems are encountered.

Some apparatus incorporate heat sensing to detect the central area of an object. Such detectors may be responsive to any heat generating object, and therefore indicate the centroid of objects which are not intended to be detected. For example, if an application desires to detect vehicles, then an apparatus which detects both vehicles and animals may not provide an acceptable solution. Furthermore, detection devices are responsive to heat rather than an object's geometry. The hotter areas of an object, such as a vehicle engine, need not be in the center of the object so heat detection techniques may not reliably indicate the centroid of an object.

Radar techniques may provide an answer to the problems encountered with heat detection. A centroid detection apparatus employing radar techniques is most responsive to metallic objects, and the location of heat generated by an object is immaterial. Thus, applications which wish to detect the centroid of a vehicle may find a radar technique superior to heat detection techniques.

On the other hand, the use of a radar technique in a centroid detection apparatus poses another set of problems. For example, a centroid detection apparatus must distinquish the central area of an object from the object's periphery in spite of a large variation in object size, speed, environment, and proximity to the apparatus. Furthermore, the centroid detection apparatus must not respond to specular returns. Specular returns occur when relatively flat metallic surfaces are presented substantially perpendicular to a radar's illumination. The reflected energy represents a specular return which may exhibit an amplitude as great as two orders of magnitude greater than a normal reflection. While a specular return may not pose a large problem for the mere detection of an object's presence, its disproportionately large amplitude must not cause a centroid detection apparatus to provide a false indication of the object's centroid. Further, well known radar techniques such as frequency agility, pulse compression, range gate jitter, beam weeping, or range gating either do not eliminate specular returns or require excessive cost to implement.

SUMMARY OF THE INVENTION

Accordingly, it is an object of the present invention to provide an improved centroid detection apparatus which utilizes a simple, reliable, and inexpensive measurement.

Another object of the present invention concerns detecting the center of a substantially metallic object by transmitting radio frequency energy and receiving portions of the energy reflected by the object using polarization diversity to eliminate specular returns.

Yet another object of the present invention concerns utilizing a directional antenna having an increased efficiency in at least two directions. Furthermore, the two directions are independently generated so that reflected energy from each of the directions may be independently processed.

The above and other objects and advantages of the present invention are carried out in one form by an apparatus having a transmitter, an antenna, a receiver, a threshold detector, and a direction comparator. A pulse of radio frequency energy is produced by the transmitter and radiated by the antenna. The antenna is configured so that it has two independently driven lobes, or directions of increased efficiency. A portion of the radiated energy pulse may be reflected by the object. The antenna receives this reflected energy pulse, and the receiver, which couples to the antenna, demodulates the reflected energy pulse. The threshold detector couples to the receiver and detects when the reflected energy pulse exceeds a predetermined amplitude. The direction comparator also couples to the receiver and detects when the reflected pulse received from one of the independently driven lobes approximately equals the reflected pulse received from the other independently driven lobe.

BRIEF DESCRIPTION OF THE DRAWINGS

A more complete understanding of the present invention may be derived by reference to the detailed description and claims when considered in connection with the accompanying drawings, wherein:

DETAILED DESCRIPTION OF THE PREFERRED EMBODIMENTS

Figure 1:
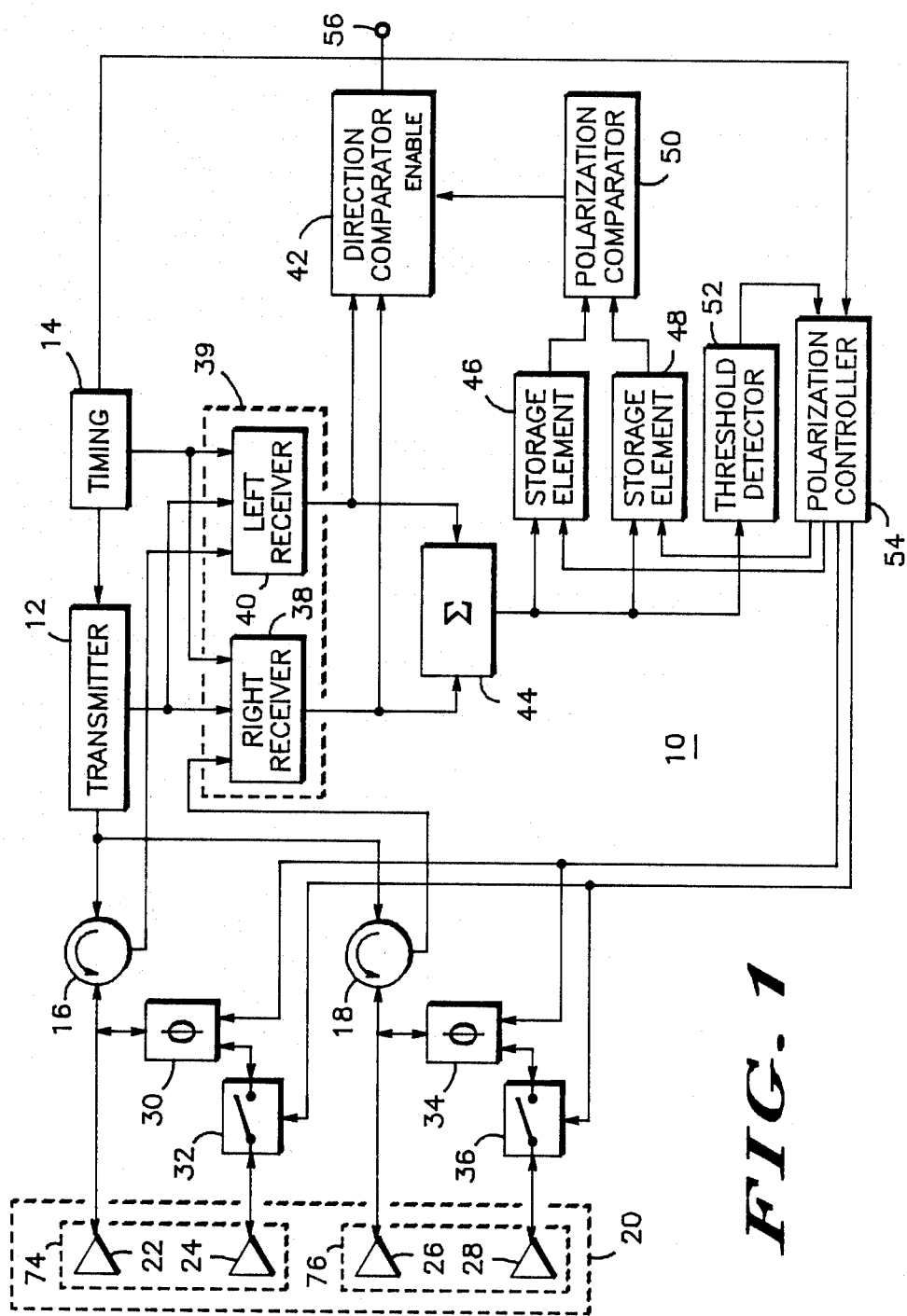
FIG. 1 shows a block diagram of one embodiment of the present invention.

FIG. 1 shows a block diagram of a preferred embodiment of a centroid detection apparatus 10. In FIG. 1 a timing section 14 has a first output which connects to an input of a transmitter 12. Transmitter 12 represents a conventional radar transmitter, and timing section 14 supplies a pulse at its first output which causes transmitter 12 to produce a pulse or burst of radio frequency energy to a power output of transmitter 12. The power output of transmitter 12 connects to first ports of circulators 16 and 18. Circulators 16 and 18 each route approximately one-half of the power from the radio frequency pulse produced by transmitter 12 to second ports of circulators 16 and 18, respectively. The second port of circulator 16 connects to left vertical elements 22 of an antenna 20, and the second port of circulator 18 connects to right vertical elements 26 of antenna 20.

The second ports of circulators 16 and 18 additionally connect to first ports of selective phase shifters 30 and 34, respectively. Second ports of selective phase shifters 30 and 34 connect to first terminals of switches 32 and 36, respectively, and second terminals of switches 32 and 36 connect to left horizontal elements 24 and right horizontal elements 28, respectively, of antenna 20.

Control inputs of switches 32 and 36 connect together and to a first output of a polarization controller 54. Likewise, a control input of selective phase shifter 30 connects to a control input of selective phase shifter 34 and to a second output of polarization controller 54. The first output of polarization controller 54 provides a signal which causes switches 32 and 36 to open and close. When switches 32 and 36 are in an open state, the entire radio frequency energy pulse appearing at the second ports of circulators 16 and 18 from transmitter 12 radiates from antenna 20 at left and right vertical elements 22 and 26, respectively. However, when polarization controller 54 provides a signal on its first output which causes switches 32 and 36 to close, the power of the radio frequency energy pulses appearing at the second ports of circulators 16 and 18 is divided equally between vertical elements 22 and 26 and horizontal elements 24 and 28, of antenna 20.

When switches 32 and 36 close, the radio frequency energy pulses radiated from the horizontal sections 24 and 28 of antenna 20 exhibit a phase difference from the energy pulses radiated from vertical sections 22 and 26 of antenna 20. The phase difference results from the operation of selective phase shifters 30 and 34. Further, the second output of polarization controller 54 controls the amount of phase difference so that the radiated pulses exhibit increasing or decreasing phase differences. Thus, when switches 32 and 36 open, antenna 20 radiates linearly polarized radio frequency energy in a linearly polarized mode. When switches 32 and 36 close, antenna 20 radiates circularly polarized radio frequency energy in a circularly polarized mode.

A simple implementation of antenna 20 is a patch or strip line array having orthogonal slots. Although such antennas tend to be unusable in guidance applications which use polarization diversity, a major goal of guidance applications is to obtain clutter rejection. In this invention the signal-to-clutter ratio is not a problem due to the limited range to the target and the antenna beamwidth. For example, the present invention may detect a twenty foot long vehicle at a range of 300 feet or less and determine the vehicle's centroid. Further, a loss of signal strength for circular polarization is not a problem because the present invention merely evaluates circularly polarized signals to reject specular returns.

Figure 2:
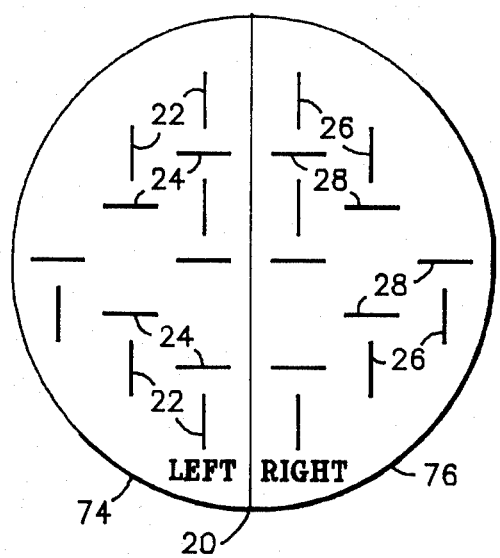
FIG. 2 shows one embodiment of an antenna portion of the present invention.

FIG. 2 shows an example of a slotted array antenna which the present invention may utilize for antenna 20. Slotted array antennas are generally known in the art, and examples are described in U.S. Pat. No. 3,701,158 by Robert H. Johnson and in U.S. Pat. No. 4,263,598 by Ernest C. Bellee which are both assigned to the same assignee as the present invention. Antenna 20, as shown in FIG. 2, contains independently driven left and right directional sections 74 and 76, respectively. Left and right directional sections 74 and 76 are substantially mirror images of each other. Left and right directional sections 74 and 76 of antenna 20 each contain vertical and horizontal polarization sections or slots. Vertical slots represent the vertical polarization section and horizontal slots represent the horizontal polarization section. Thus, left directional section 74 of antenna 20 contains a plurality of vertical slots which provide the left vertical elements 22, and a plurality of horizontal slots which provide the left horizontal elements 24. Likewise, right directional section 76 of antenna 20 has a plurality of vertical slots which provide right vertical elements 26, and a plurality of horizontal slots which provide right horizontal elements 28. The horizontal and vertical slots are substantially orthogonal to each other. Of course, those skilled in the art will recognize that the terms left, right, vertical and horizontal are relative terms intended for reference only and do suggest a particular orientation, such as with respect to the force exerted by gravity.

A strip line or micro strip feed network powers slotted array antenna 20. The energy radiated from each slot of antenna 20 has a predetermined phase relationship relative to the energy radiated from other slots of antenna 20.

Figure 3:
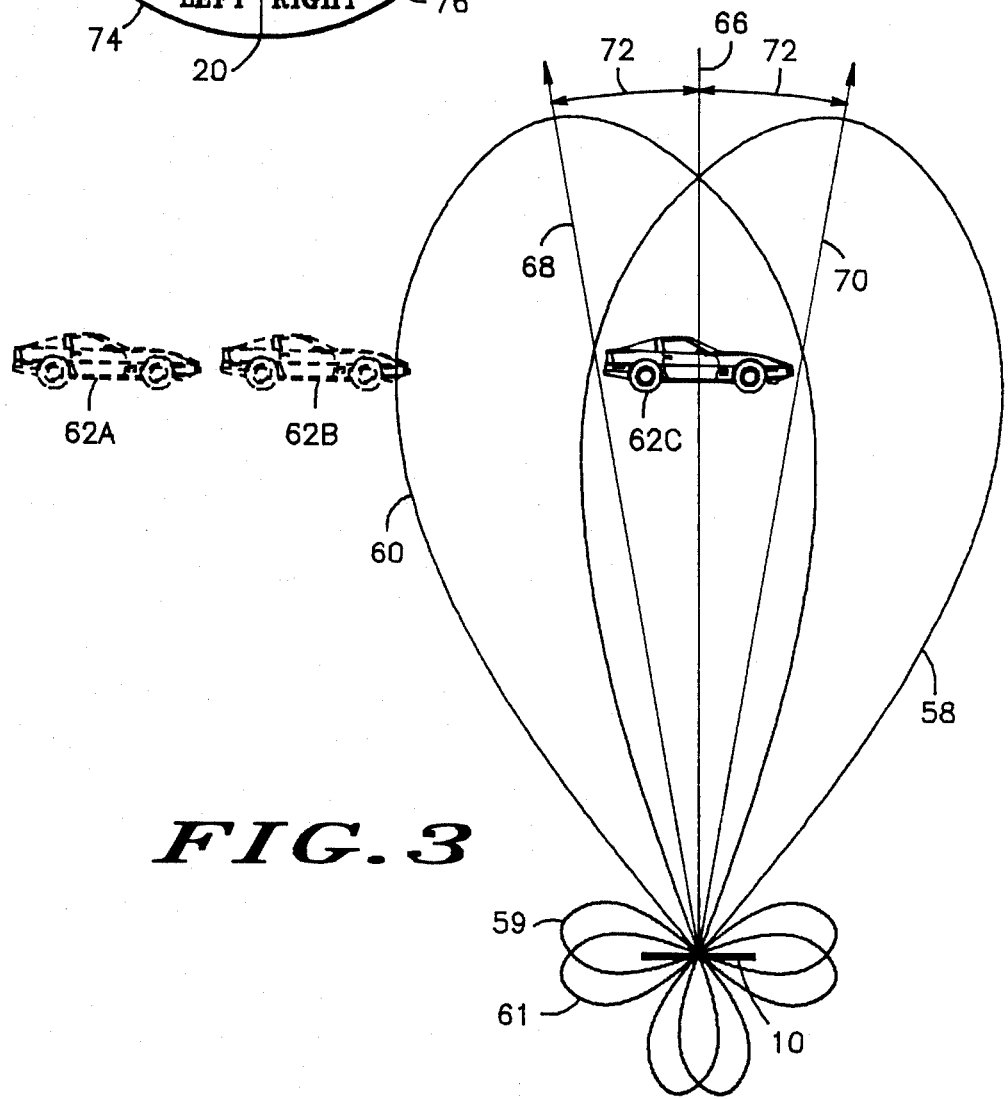
FIG. 3 shows a response curve of an antenna portion of the present invention.

Referring to FIG. 3, antenna 20 associated therewith has a left major lobe, or direction of increased efficiency, 60 which results from operation of left directional section 74 of antenna 20. Additionally, antenna 20 has a right major lobe, or direction of increased efficiency, 58 which results from operation of right directional section 76 of antenna 20. Left major lobe 60 is symmetrical about opposing sides of a line shown as direction 68. Likewise, major lobe 58 is symmetrical about opposing sides of a line shown as direction 70. FIG. 3 additionally depicts an aim line 66 which may be orthogonal to both vertical slots 22 and 26 and horizontal slots 24 and 28 of antenna 20. Directions 68 and 70 are each separated from aim line 66 by a predetermined angle 72. The angle 72 is chosen to accommodate the size of objects whose centroid is to be detected by centroid detector 10 and the anticipated range of objects from centroid detector 10.

FIG. 3 also shows minor lobes 61 which are incidentally produced with left major lobe 60, and minor lobes 59 which are incidentally produced with right major lobe 58. Together, major lobe 60 and minor lobes 61 define a curve of equivalent sensitivity for left directional section 74 of antenna 20. Likewise, major lobe 58 and minor lobes 59 define a curve of equal sensitivity for right directional section 76 of antenna 20. Radio frequency energy radiated from antenna 20 exhibits approximately equal amplitude levels anywhere on the curves which are represented by lobes 58, 59, 60, and 61. A greater signal strength occurs within the area circumscribed by lobes 58, 59, 60, and 61; and, antenna 20 exhibits a greater sensitivity to signals which are reflected from objects within the area circumscribed by lobes 58, 59, 60, and 61.

A radio frequency energy pulse radiated from antenna 20 may encounter an object 62, such as a vehicle, in a position shown as 62C in FIG. 3. Object 62 may reflect a portion of this radio frequency energy pulse so that antenna 20 receives the reflected portion. Referring to FIG. 1, the received portion of reflective energy feeds back to the second ports of circulators 16 and 18. Circulators 16 and 18 route the received energy to third ports of circulators 16 and 18, respectively.

The third ports of circulators 16 and 18 connect to an input of a receiver 39. In the present embodiment receiver 39 contains a right section 38 and a left section 40. Accordingly, a third port of circulator 18 connects to a signal input of right section 38, and the third port of circulator 16 connects to a signal input of left section 40. A second output from timing section 14 connects to timing inputs of receiver 39, and a reference signal output from transmitter 12 connects to reference inputs of receiver 39.

The left and right sections of receiver 39 are substantially identical, and are used to demodulate the received energy pulses from the left and right directional sections of antenna 20, respectively. The reference signal supplied from transmitter 12 aides in this demodulation in a conventional manner.

A timing signal provided from timing section 14 enables the operation of receiver 39 at desirable times. This timing signal may be used to define the range capability of centroid detector 10. For example, if centroid detector 10 is required to detect the centroid of objects which are between 100 and 500 meters away from centroid detector 10, then receiver 39 need operate only from 65 nano-seconds to 335 nano-seconds after the beginning of the radiation of a radio frequency energy pulse from antenna 20. The 65 to 335 nano-second time period represents the time required for electromagnetic energy to travel from antenna 20 to an object 62 and back to antenna 20 when object 62 is within the 100 to 500 meter range from centroid detector 10.

Left and right demodulated signals are presented at outputs of left section 40 and right section 38, respectively, of receiver 39. The outputs of receiver 39 connect to separate inputs of a direction comparator 42 and an addition circuit 44. An output of addition circuit 44 connects to a signal input of storage element 46, a signal input of a storage element 48, and an input of a threshold detector 52. Outputs from storage elements 46 and 48 connect to separate inputs of a polarization comparator 50. An output from polarization comparator 50 connects to an enable input of direction comparator 42, and an output of direction comparator 42 connects to a terminal 56. Terminal 56 provides the output signal from centroid detector 10, which exhibits an active logical state when the centroid of an object 62 is located along aim line 66 (See FIG. 3).

An output from threshold detector 52 connects to a first input of polarization controller 54, and a third output from timing section 14 connects to a second input of polarization controller 54. Third and fourth outputs from polarization controller 54 connect to control inputs of storage elements 46 and 48, respectively. Threshold detector 52 monitors the amplitude of a signal produced by addition circuit 44. A signal supplied by threshold detector 52 to the first input of polarization controller 54 changes logical states when the amplitude of the signal supplied by addition circuit 44 exceeds a predetermined level. The predetermined level which is used by threshold detector 52 may be adjustable. By adjusting this predetermined level, centroid detector 10 may be placed in many different environments which exhibit a large variation in clutter reflection. Threshold detector 52 may be adjusted so that centroid detector 10 effectively differentiates between a desired object 62 and background clutter.

Polarization controller 54 controls the operation of storage elements 46 and 48, and the linear and circular polarization of radiated radio frequency energy pulses from antenna 20. The control functions performed by polarization controller 54 occur in response to the signal output from threshold detector 52 and the signal generated at the third output of timing section 14.

The present invention operates in three modes as described below in connection with three different scenarios. In the first scenario, object 62 is not within the detection range of centroid detector 10. Referring to FIG. 3, phantom position 62A illustrates this scenario. Referring back to FIG. 1, polarization controller 54 outputs a signal at its first output which causes switches 32 and 36 to open. Accordingly, antenna 20 radiates pulses of radio frequency energy only through left and right vertical elements 22 and 26 of antenna 20. A linearly polarized pulse of radio frequency energy results. Since object 62A (see FIG. 3) is not within the range of centroid detector 10, the reflections received by antenna 20 in response to the transmitted pulse occur essentially from background clutter. Receiver 39 demodulates these reflections, but generates only relatively low level signals in response thereto. The low level demodulation signals do not exhibit a sufficiently high amplitude to exceed the level detected by threshold detector 52. Thus, centroid detector 10 continues to operate in the first mode.

A second scenario where object 62 begins to come within the range of centroid detector 10 causes centroid detector 10 to operate in a second mode. Additionally, the operation of centroid detector 10 in the second mode assumes that no spectral returns are reflected from object 62. This scenario begins when object 62 is in a position shown in phantom as 62B in FIG. 3.

Initially, antenna 20 radiates only linearly polarized energy. Eventually, reflections received from object 62 and demodulated within receiver 39 exhibit an amplitude sufficiently high to exceed the threshold level utilized by threshold detector 52. At this point in time, the output signal from threshold detector 52 to polarization controller 54 changes state. In response, polarization controller 54 causes switches 32 and 36 to close. As mentioned above, antenna 20 radiates circularly polarized energy when switches 32 and 36 close. At this time polarization controller 54 controls the operation of selectable phase shifters 30 and 34 so that a desirable circularly polarized signal results.

Polarization controller 54 additionally receives a control signal from timing section 14. This control signal operates synchronously with the signal provided from timing signal 14 to transmitter 12. In a preferred embodiment of the present invention this control signal becomes active only during every other pulse of radio frequency energy that is produced by transmitter 12 and radiated at antenna 20. Polarization controller 54, in response to this control signal, causes switches 32 and 36 to open during every other pulse of transmitted radio frequency energy. Resultingly, centroid detector 10 alternately radiates circularly and linearly polarized pulses of radio frequency energy.

Since alternate circularly and linearly polarized pulses are radiated from antenna 20, alternately circularly and linearly polarized pulses are reflected from object 62 and received by antenna 20. Since storage elements 46 and 48 operate under control of the polarization controller 54, demodulated linearly polarized signals are stored in one of storage elements 46 and 48, and circularly polarized signals are stored in the other of storage elements 46 and 48. Storage elements 46 and 48 may comprise conventional sample and hold amplifier circuits.

Polarization comparator 50 determines whether a specular return is being received by centroid detector 10. Specular returns represent reflections from substantially flat, perpendicular to the radiated energy, surfaces of the object being detected. Specular returns typically exhibit amplitudes much greater than are typically reflected from non-flat or non-perpendicular surfaces. Such specular returns are detected so that an overload of centroid detector 10 and false indications of an object's centroid at terminal 56 may be prevented. Flat surfaces of the object cause reversal of the object's image such as occurs when mirrors reflect visible light. When a circularly polarized signal is used, the image comes back cross-polarized, but no cross-polarization occurs when linearly polarized signals are used. Accordingly, polarization comparator 50 compares most recently received circularly polarized and linearly polarized reflections. If a reflection represents a specular return, then the circularly polarized and linearly polarized reflection will exhibit substantially different amplitudes. However, if the reflection does not represent a specular return the linearly and circularly polarized signals will exhibit similar amplitudes. Thus, polarization comparator 50 outputs a signal to direction comparator 42 which enables direction comparator 42 only when the amplitudes of the circularly and linearly polarized reflections are similar.

This second mode of operation for centroid detector 10 assumes no specular returns. Thus, in the second mode direction comparator 42 is enabled by polarization comparator 50. Direction comparator 42 compares the amplitudes of reflections received at the left and right directional sections of antenna 20. When object 62 is located at position 62B (See FIG. 3), the amplitude of a reflection received at left directional section 74 of antenna 20 exceeds the amplitude of a reflection received at right directional section 76 of antenna 20 because the reflecting surfaces of object 62 are more closely aligned with direction 68 than with direction 70.

On the other hand, when object 62 arrives at position 62C the reflecting surfaces of object 62 are equally positioned between directions 68 and 70. Thus, when object 62 reaches position 62C direction comparator 42 receives substantially equal amplitude signals from right section 38 and left section 40 of receiver 39. In response, direction comparator 42 outputs a signal to terminal 56 whose level indicates that the centroid of object 62 has been detected. This occurs when the centroid of object 62 reaches aim line 66.

A third scenario describing the third mode of operation for centroid detector 10 occurs when object 62 is within range of centroid detector 10, but reflects specular returns. As described above, when specular returns are received the circularly polarized signals and the linearly polarized signals stored in storage elements 46 and 48 exhibit substantially different amplitudes. In response, polarization comparator 50 disables direction comparator 42. In this mode, the extremely large amplitude of a specular return might improperly cause direction comparator 42 to decide that reflections received from left directional section 74 of antenna 20 equal the reflections received from right directional section 76 of antenna 20. This may occur regardless of the precise position of object 62. However, since polarization comparator 50 disables direction comparator 42, no signal is output to terminal 56, and the detection of an object's centroid is not indicated when specular returns are received.

The present invention is described above with reference to a particular embodiment which facilitates teaching the invention. Those skilled in the art will recognize that many alternative embodiments also fall within the scope of the present invention. For example, the above embodiment described an essentially dual system having two directional antenna sections, two circulators, and two receivers. The scope of the present invention also includes the use of a simplex system which achieves the directionality described herein through time multiplexing. Accordingly, an alternate embodiment may employ an antenna 20 having only one directional section which is capable of changing its directionality in response to an external signal from polarization controller 54. Such an antenna may be achieved by selectively controlling the phasing relationships exhibited by the feed network for a slotted array antenna. Furthermore, receiver 39 may represent a simplex device which alternately demodulates signals received from direction 68 and direction 70 (see FIG. 3). This alternative embodiment may further require an additional storage element coupled between one of the inputs of direction comparator 42 and receiver 39.

An alternate embodiment of the present invention may utilize a switch controlled by polarization controller 54 to replace addition circuit 44. Thus, storage elements 46 and 48, and threshold detector 52 may alternately respond to signals received at left and right directional sections of antenna 20.

A further alternative embodiment to the present invention may connect the output of polarization comparator 50 to an additional terminal instead of to an enable input of direction comparator 42. In this embodiment, the centroid detection output signal at output terminal 56 would be valid only when a signal output from polarization comparator 50 indicates that circularly and linearly polarized reflections exhibit similar amplitudes.

Yet another alternative embodiment would be to have four antenna sections for left-right and up-down directional differentiation. This alternative embodiment could detect the centroid of objects which travel in three dimensions, such as air or space.

Other embodiments might use continuous wave or pulse doppler radar techniques known to those skilled in the art instead of the pulse operation described herein. These techniques may also provide polarization diverse signals to prevent specular returns giving false indications.

These and other changes and modifications to the preferred embodiment which are obvious to those skilled in the art are intended to be included within the scope of the present invention.

What is claimed is:

1. An apparatus for detecting the centroid of an object, said apparatus comprising:
   a transmitter for producing a pulse of radio frequency energy;
   an antenna coupled to said transmitter, said antenna radiating the radio frequency energy pulse and receiving portions of the radio frequency energy pulse reflected by the object, said antenna having an increased efficiency in first and second independently operative directions, said antenna further comprising first and second polarization sections;
   phase shifting means coupled between said first and second polarization sections for permitting radiation and reception of circularly polarized radio frequency energy;
   switch means for coupling said phase shifting means to said second polarization sections of said antenna for permitting selective operation of said antenna in circularly and linearly polarized modes, said circularly and linearly polarized modes enabling the apparatus to distinguish specular returns;
   a receiver coupled to said antenna for demodulating the reflected portions of the radio frequency energy pulse;
   a threshold detector coupled to said receiver for detecting when the reflected portions of the radio frequency energy pulse exceed a predetermined amplitude; and a direction comparator coupled to said receiver for detecting when the reflected portions of the radio frequency energy pulse received from the first direction approximately equals the reflected portions of the radio frequency energy pulse received from the second direction, said specular returns being average with said received portions of said radio frequency energy reflected by the object to define a centroidal area.

2. A centroid detection apparatus as claimed in claim 1 wherein said antenna comprises first and second directional sections, the first directional section being for radiating and receiving energy in the first direction, and the second directional section being for radiating and receiving energy in the second direction.

3. A centroid detection apparatus as claimed in claim 2 wherein said antenna comprises a slotted array antenna.

4. A centroid detection apparatus as claimed in claim 1 wherein said receiver comprises first and second sections, said first and second sections being for demodulating reflected portions of the energy pulse received from the first and second directions, respectively.

5. A centroid detection apparatus as claimed in claim 1 wherein said transmitter produces additional pulses of radio frequency energy and the apparatus additionally comprises:
a storage element having an input coupled to said receiver and having an output;
a polarization comparator having an input coupled to the output of said storage element and an output coupled to said direction comparator, said polarization comparator indicating when reflected portions of radio frequency energy pulses received while said antenna operates in the circularly polarized mode approximately equal reflected portions of radio frequency energy pulses received while said antenna operates in the linearly polarized mode; and
a polarization controller having a first output coupled to said switch, a second output coupled to a control input of said storage element, and an input coupled to an output of said threshold detector, said polarization controller operating said antenna in circularly and linearly polarized modes and for causing said storage element to save a signal responsive to an amplitude of the reflected portions of the radio frequency energy pulse.

6. A centroid detection apparatus as claimed in claim 5 wherein said storage element comprises a sample and hold circuit.

7. A centroid detection apparatus as claimed in claim 5 additionally comprising a second storage element coupled between said receiver and the first input of said polarization comparator and having a control input coupled to a third output of said polarization controller.

8. A method of detecting the centroid of an object, said method comprising the steps of:
radiating linearly polarized pulses of radio frequency energy;
receiving portions of the radio frequency energy pulse reflected by the object, said receiving step having an increased efficiency in first and second directions;
demodulating the reflected portions of the radio frequency energy pulse received in said receiving step;
detecting when an amplitude of the reflected portions of the radio frequency energy pulse demodulated in said demodulating step exceeds a predetermined amplitude;
switching between linear and circular polarization of radio frequency energy, said circular polarization for distinguishing specular returns; and
determining when the reflected portions of the radio frequency energy pulse demodulated in said demodulating step and received from the first direction approximately equals the reflected portions of the radio frequency energy pulse demodulated in said demodulating step and received from the second direction.

9. A method as claimed in claim 8 wherein said receiving step comprises the step of utilizing an antenna having first and second directional sections, the first directional section being for receiving energy from the first direction, and the second directional section being for receiving energy from the second direction.

10. A method as claimed in claim 8 additionally comprising the steps of:
comparing received circularly polarized energy pulses to received linearly polarized energy pulses;
indicating when amplitudes of received circularly polarized energy pulses approximately equal amplitudes of received linearly polarized energy pulses; and
permitting operation of said determining step only when said indicating step indicates that amplitudes of circularly and linearly polarized pulses are approximately equal.

11. An apparatus for detecting the centroid of an object, said apparatus comprising:
a transmitter for producing pulses of radio frequency energy;
a switch coupled to said transmitter, said switch being for selectively operating the apparatus in circularly and linearly polarized modes;
a slotted array antenna having first and second directional sections for radiation of the pulses of radio frequency energy in first and second independently driven lobes, respectively, and having first and second sets of polarization slots so that said antenna radiates and receives linearly polarized energy pulses by activating only one of the first and second sets of polarization slots and radiates and receives circularly polarized energy pulses by activating both of the first and second sets of polarization slots, said antenna being coupled to said transmitter and said switch;
a receiver coupled to said antenna and to said switch;
a storage element coupled to said receiver;
a polarization comparator having a first input coupled to said receiver and a second input coupled to said storage element, said polarization comparator being for detecting when received circularly polarized pulses approximately equal received linearly polarized pulses;
a threshold detector coupled to said receiver for detecting when received pulses exceed a predetermined amplitude;
a direction comparator coupled to said polarization comparator and receiver for detecting when received pulses at the first directional section of said antenna approximately equal received pulses at the second directional section of said antenna; and a polarization controller coupled to said switch, storage element, and threshold detector, said polarization controller being for operating said antenna in circularly and linearly polarized modes, and for causing said storage element to save a signal responsive to amplitude of received pulses.

12. An apparatus for detecting the centroid of an object, said apparatus comprising:

transmitter for producing pulses of radio frequency energy;

antenna coupled to said transmitter, said antenna for radiating said pulses of radio frequency energy and receiving portions of said pulses which are reflected by the object such that said antenna has an increased efficiency in first and second independently operative directions, said antenna further comprising first and second polarization sections;

receiver coupled to said antenna for demodulating said reflected portions of said pulses of radio frequency energy reflected by the object;

threshold detector coupled to said receiver for detecting when said reflected portions exceed a predetermined amplitude;

direction comparator coupled to said receiver for detecting when said reflected portions received from said first independently operative direction approximately equal said reflected portions received from said second independently operative direction;

phase shifter coupled between said first and second polarization sections, said polarization sections for permitting radiation and reception of circularly polarized radio frequency energy;

switch coupled between said phase shifter and said first and second polarization sections, said switch for permitting selective operation of said antenna in circularly and linearly polarized modes;

storage element having an input coupled to said receiver and having an output;

polarization comparator having an input coupled to said output of said storage element and an output coupled to said direction comparator, said polarization comparator for indicating when said reflected portions received while said antenna operates in said circularly polarized mode approximately equal reflected portions received while said antenna operates in said linearly polarized mode; and polarization controller having a first output coupled to said switch, a second output coupled to a control input of said storage element, and an input coupled to an output of said threshold detector, said polarization controller for operating said antenna in said circularly and linearly polarized modes and for causing said storage element to save a signal responsive to an amplitude of said reflected portions.

13. An apparatus for detecting the centroid of an object as in claim 12 wherein said storage element comprises a sample and hold circuit.

14. An apparatus for detecting the centroid of an object as in claim 12 additionally comprising a second storage element coupled between said receiver and said first input of said polarization comparator and having a control input coupled to a third output of said polarization controller.

15. An apparatus for detecting the centroid of an object as in claim 12 wherein said antenna comprises first and second directional sections, said first directional section for radiating and receiving said pulses of radio frequency energy in said first direction, and said second directional section for radiating and receiving said pulses of radio frequency energy in said second direction.

16. An apparatus for detecting the centroid of an object as in claim 15 wherein said antenna comprises a slotted array antenna.

17. An apparatus for detecting the centroid of an object as in claim 12 wherein said receiver comprises first and second sections, said first and second sections for demodulating said reflected portions of said pulses of radio frequency received from said first and second independently operative directions, respectively.

* * * * *